US007249900B1

(12) United States Patent
Katano et al.

(10) Patent No.: US 7,249,900 B1
(45) Date of Patent: Jul. 31, 2007

(54) APPROACH FOR IMPLEMENTING LOCKED PRINTING ON PRINTING DEVICES

(75) Inventors: Seiichi Katano, Cupertino, CA (US); Seong Kim, Saratoga, CA (US); Ke Wei, San Jose, CA (US); Jayasimha Nuggehalli, Cupertino, CA (US)

(73) Assignee: Ricoh Company Limited, Tokyo (JP)

( * ) Notice: Subject to any disclaimer, the term of this patent is extended or adjusted under 35 U.S.C. 154(b) by 10 days.

(21) Appl. No.: 11/346,479

(22) Filed: Feb. 1, 2006

(51) Int. Cl.
*B41J 11/44* (2006.01)
(52) U.S. Cl. .......................... 400/76; 400/70; 358/1.15
(58) Field of Classification Search ................. 400/76, 400/70; 358/1.15
See application file for complete search history.

(56) References Cited

U.S. PATENT DOCUMENTS 6,965,449 B2 * 11/2005 Sugiyama .................. 358/1.15
7,136,176 B2 * 11/2006 Sugiyama .................. 358/1.14
2004/0117389 A1 * 6/2004 Enami et al. ................ 707/100
2006/0112021 A1 * 5/2006 Maki ............................ 705/67

* cited by examiner

*Primary Examiner*—Minh Chau
(74) *Attorney, Agent, or Firm*—Hickman Palermo Truong & Becker LLP; Edward A. Becker

(57) ABSTRACT

An approach is provided for implementing locked printing on a printing device. The printing device includes a user interface configured to display information and accept user input. The printing device includes a locked print process that is configured to examine print data received by the printing device and determine whether locked printing is to be used for the print data. The locked print process is further configured to verify password data entered via the user interface and if the password data is successfully verified, then allow the print data to be processed and a printed version of the electronic document reflected in the print data to be generated. The printing device also includes a Web server that provides a Web-based user interface to allow a user, such as an administrator, to specify configuration data that defines one or more functions performed by the locked print process.

12 Claims, 11 Drawing Sheets

APPROACH FOR IMPLEMENTING LOCKED PRINTING ON PRINTING DEVICES

FIELD OF THE INVENTION

This invention relates generally to locked printing on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Some printing devices are configured with a feature known as "locked printing" to provide control over the printing of electronic documents. When a printing device is configured with a locked printing feature and print data is sent to the printing device, a printed version of an electronic document reflected in the print data is not generated until a password is verified at the printing device. Typically a user enters a password through an operation panel on the printing device. The printing device verifies the password and if the password is successfully verified, allows a printed version of the electronic document reflected in the print data to be generated, i.e., printed.

One of the problems with convention locked printing approaches is that setting up the locked printing feature requires that an administrator manually configure a printing device through the operation panel of the printing device. This process is tedious and time consuming and makes implementing locked printing on large deployments of printing devices expensive and time consuming, because of the human resources required.

Based on the foregoing, there is a need for an approach for configuring locked printing on printing devices that does not suffer from limitations of prior approaches.

SUMMARY

An approach is provided for implementing locked printing on a printing device. The printing device includes a user interface, such as an operation panel, configured to display information and accept user input. The printing device includes a locked print process that is configured to examine print data received by the printing device and determine whether locked printing is to be used for the print data. The locked print process is also configured to cause the print data to be stored on the printing device if locked printing is to be used for the print data. The locked print process is further configured to verify password data entered via the user interface and if the password data is successfully verified, then allow the print data to be processed and a printed version of the electronic document reflected in the print data to be generated. The locked print process may also be configured to perform a variety of other functions, as described in more detail hereinafter. These functions are described in more detail hereinafter. The printing device also includes a Web server that provides a Web-based user interface to allow a user, such as an administrator, to specify configuration data that defines one or more functions performed by the locked print process. The approach provides a flexible and user-friendly user interface that allows an administrator to customize workflows to suite a particular implementation.

According to one aspect of the invention, a printing device comprises a user interface, a locked print process and a Web server. The user interface is configured to display information and accept user input. The locked print process is configured to examine print data received by the printing device to determine whether password data must be verified at the printing device before a printed version of an electronic document reflected in the print data can be generated and if password data must be verified at the printing device before a printed version of an electronic document reflected in the print data can be generated, then cause the print data to be stored on the printing device. The locked print process is also configured to verify password data entered via the user interface and if the password data is successfully verified, then allow the printed version of the electronic document reflected in the print data to be generated. The Web server is configured to generate one or more Web pages and cause the one or more Web pages to be provided to a client device, wherein processing of the one or more Web pages at the client device allows a user to enter configuration data that defines one or more functions performed by the locked print process, and receive the configuration data from the client device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:
   I. OVERVIEW
   II. ARCHITECTURE
   III. CONFIGURING LOCKED PRINTING
   IV. LOCKED PRINTING
   V. HOUSEKEEPING AND LOGGING FUNCTIONS
   VI. WEB-BASED USER INTERFACE FOR CONFIGURING LOCKED PRINTING
   VII. CONFIGURATION FILES
   VIII. IMPLEMENTATION MECHANISMS I. Overview An approach is provided for implementing locked printing on a printing device. The printing device includes a user interface, such as an operation panel, configured to display information and accept user input. The printing device includes a locked print process that is configured to examine print data received by the printing device and determine whether locked printing is to be used for the print data. The locked print process is also configured to cause the print data to be stored on the printing device if locked printing is to be used for the print data. The locked print process is further configured to verify password data entered via the user interface and if the password data is successfully verified, then allow the print data to be processed and a printed version of the electronic document reflected in the print data to be generated. The locked print process may also be configured to perform a variety of other functions, as described in more detail hereinafter. These functions are described in more detail hereinafter. The printing device also includes a Web server that provides a Web-based user interface to allow a user, such as an administrator, to specify configuration data that defines one or more functions performed by the locked print process. The approach provides a flexible and user-friendly user interface that allows an administrator to customize workflows to suite a particular implementation.

II. Architecture

Figure 1:
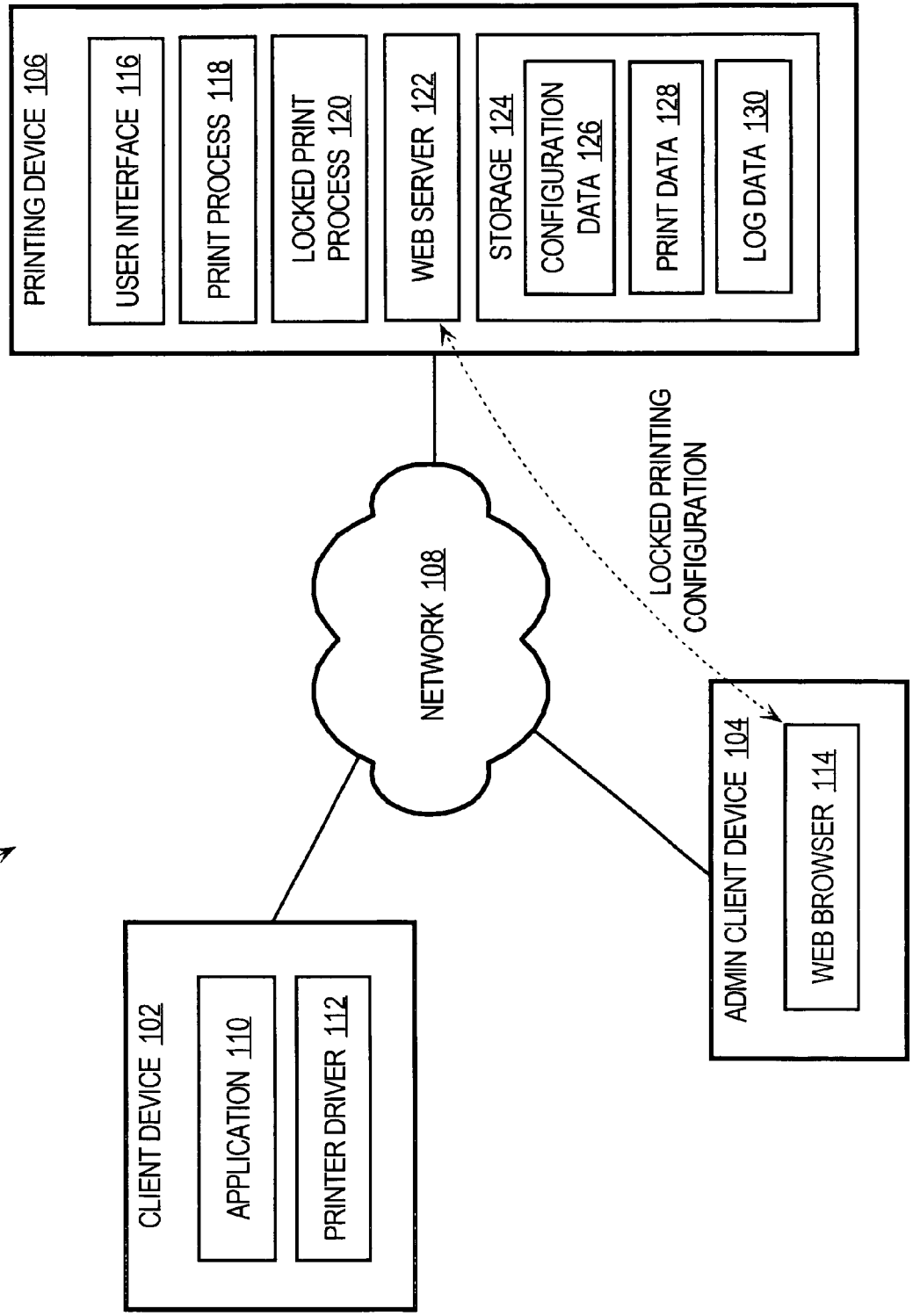
FIG. 1 is a block diagram that depicts an arrangement 100 for implementing locked printing on a printing device according to an embodiment of the invention.

FIG. 1 is a block diagram that depicts an arrangement 100 for implementing locked printing on a printing device according to an embodiment of the invention. Arrangement 100 includes a client device 102, an administrative (Admin) client device 104 and a printing device 106, communicatively coupled via a network 108.

Client device 102 and admin client device 104 may be implemented by any type of client devices. Example implementations of client device 102 and admin client device 104 include, without limitation, workstations, personal computers, laptop computers, personal digital assistants (PDAs), cellular telephony devices and any type of mobile devices. In the example arrangement depicted in FIG. 1, client device 102 is configured with an application 110 and a printer driver 112. Application 110 may be any type of application process. Examples of application 110 include, without limitation, a word processor, a spreadsheet program and an email client. Printer driver 112 is configured to provide a user interface for a user to specify that locked printing is to be used to print particular print data. Printer driver 112 is also configured to process data from application 110 and generate print data that is provided to printing device 106 for processing. Thus, application 110 and printer driver 112 operate together to generate and provide print data to printing device 106. Admin client device 104 is configured with a Web browser 114 to allow a user, such as an administrator, to configure locked printing functionality for printing device 106, as described in more detail hereinafter. Client device 102 and admin client device 104 may be configured with other mechanisms, processes and functionality, depending upon a particular implementation. Furthermore, although the configuring of locked printing is depicted in the figures and described herein in the context of using Web browser 114 executing on admin client device 104 that is separate from client device 102, the invention is not limited to is context and the configuring of locked printing may be performed using a Web browser executing on client device 102.

Printing device 106 may be implemented by any type of device that is capable of processing print data received from client device 102 and generate printed versions of electronic documents reflected in the print data. In example arrangement 100, printing device 106 includes a user interface 116, a print process 118, a locked print process 120, a Web server 122 and storage 124. Printing device 106 may be configured with other mechanisms, processes and functionality, depending upon a particular implementation, and the approach described herein for configuring locked printing on a printing device is not limited to any type of printing device 106. For example, printing device 106 may be a multifunction peripheral (MFP) that includes any combination of printing, copying, facsimile and scanning capability, etc.

User interface 116 may be any mechanism and/or medium that provides for the exchange of information between a user and printing device 106. Examples of user interface 116 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 106 may be configured to display information on user interface 116 in any number of languages, depending upon a particular implementation.

Print process 118 may be implemented by one or more processes for processing print data received from client device 102 and for generating a printed version of an electronic document reflected in the print data. Print process 118 may be implemented as a resident process on printing device 106. Alternatively, print process 118 may be provided to printing device 106 on a removable media.

Locked print process 120 is a process configured to provide locked print services, as described in more detail hereinafter.

Web server 122 may be implemented by any mechanism or process for generating Web pages. The Web pages may be any type of Web pages, for example HTML, and may include any type of content, depending upon a particular implementation. Examples of Web server 122 include, without implementation, an Apache web server.

Storage 124 may be implemented by any type of storage, including volatile and non-volatile storage. Examples of storage 124 include, without limitation, random access memory (RAM) and one or more disks.

User interface 116, print process 118, locked print process 120, Web server 122 and storage 124 may be implemented in hardware, software, or any combination of hardware or software, depending upon a particular implementation.

Network 108 may be implemented with any type of medium and/or mechanism that facilitates the wireless exchange of information between client device 102, printing device 106 and admin client device 104. Furthermore, network 108 may use any type of communications protocol and may be secured or unsecured, depending upon the requirements of a particular application.

III. Configuring Locked Printing

According to the approach described here for implementing locked printing on a printing device, a Web-based user interface is provided to allow a user, such as an administrator, to specify configuration data that defines one or more functions performed by locked print process 118. More specifically, Web server 122 is configured to generate one or more Web pages and cause the Web pages to be provided to admin client device 104 over network 108. When processed by Web browser 114, the Web pages allow a user, such as an administrator, to enter configuration data. The one or more Web pages may use any type of user interface objects including, for example, pull down menus, forms, fields and dialog boxes, and the approach is not limited to any particular user interface or user interface objects. The configuration data may specify any attributes or characteristics of locked printing functionality, including all of the locked printing functionality described hereinafter. Specific examples user interfaces that may be used in the Web-based user interface are provided hereinafter.

The configuration data entered by the administrator is transmitted from admin client device 104 to printing device 106 and stored on storage 124 as configuration data 126. The configuration data may be transmitted to printing device 106 using a wide variety of techniques and the approach is not limited to any particular technique. For example, Web browser 114 may transmit the configuration data to printing device 106 in a request for a Web page, such as an HTTP request. In this situation, the configuration data may be encoded or encrypted and carried as part of a URL. As another example, Web browser 114 may transmit the configuration data to printing device 106 in a POST command.

Locked printing is also configured on the client side, i.e., on client device 102. More specifically, printer driver 112 is configured to support the specified locked printing. For example, the user interface that is normally invoked when an electronic document is printed includes user interface objects associated with locked printing. This may include, for example, user interface objects that allow a user to specify whether locked printing is to be used for a particular electronic document and if so, a user ID and password to be used for the locked printing of the particular electronic document.

IV. Locked Printing

Figure 2:
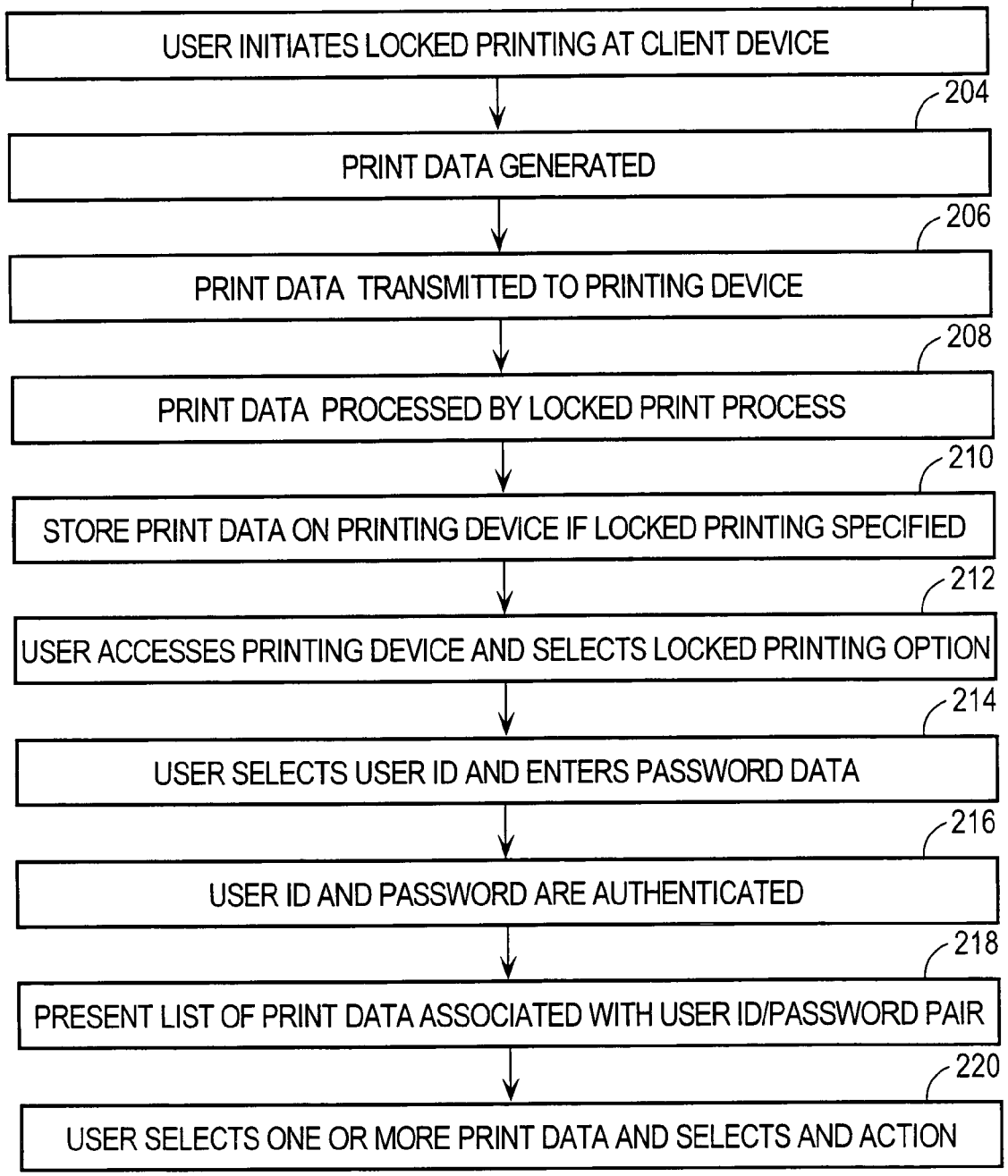
FIG. 2 is a flow diagram depicting an approach for implementing locked printing on a printing device.
Figure 3:
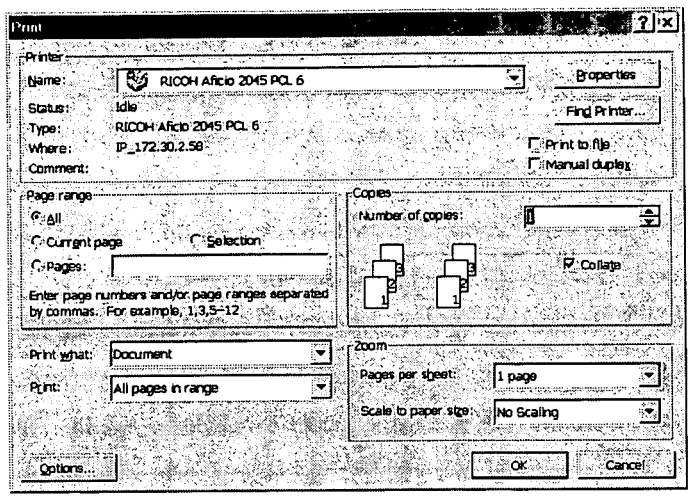
FIG. 3 depicts an example user interface generated by printer driver after the user has selected a print option from application.
Figure 4:
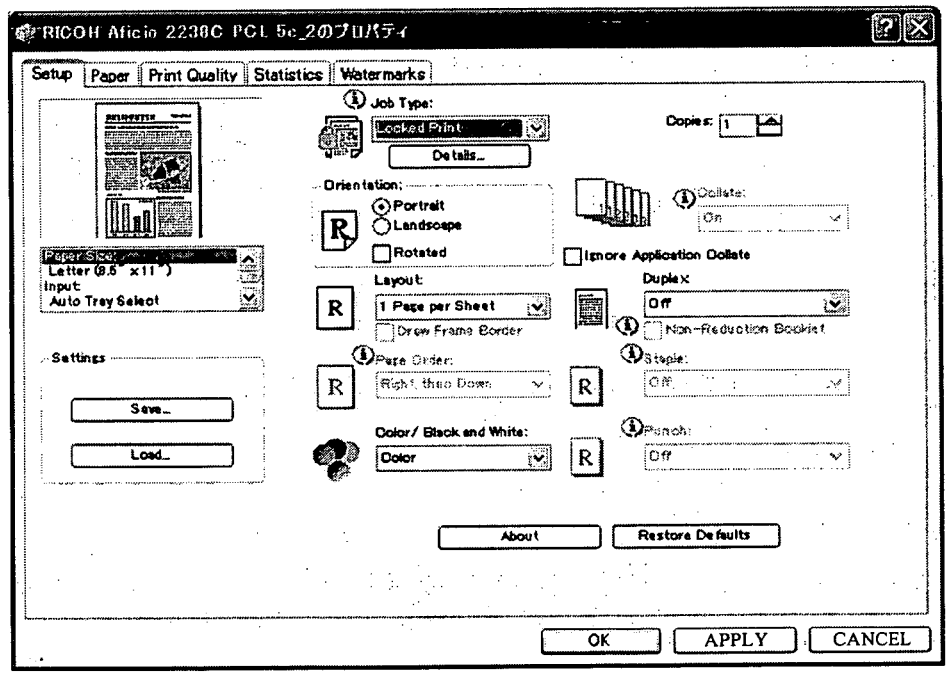
FIG. 4 depicts a printer properties configuration screen that is displayed in response to a user selecting the "properties" button in FIG. 3
Figure 5:
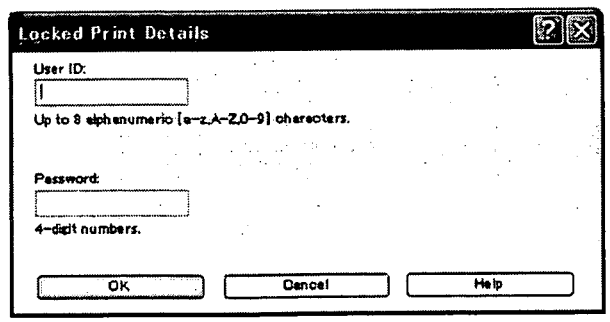
FIG. 5 depicts a locked printing details screen that allows a user to enter a user identification (ID) and password data in the form of a password.

An approach for implementing locked printing on a printing device is now described with reference to a flow diagram 200 of FIG. 2. In step 202, locked printing is initiated by a user at a client device. For example, a user of client device 102 initiates locked printing from application 110. FIG. 3 depicts an example user interface generated by printer driver 112 after the user has selected a print option from application 110. FIG. 4 depicts a printer properties configuration screen that is displayed in response to a user selecting the "properties" button in FIG. 3. The printer properties configuration screen allows a user to select locked printing and to specify details of the locked printing via a "details" button. FIG. 5 depicts a locked printing details screen that allows a user to enter a user identification (ID) and password data in the form of a password.

In step 204, print data is generated by printer driver 112. If the user has selected locked printing, then the print data includes data to indicate this. For example, the print data may include one or more Print Job Language (PJL) or Page Descriptor Language (PDL) commands that specify locked printing is to be used.

In step 206, the print data is transmitted to printing device 106 over network 108. To cause the print data to be processed by locked print process 120, the print data may be transmitted to a particular port. For example, the printing data may be transmitted to a particular Transport Control Protocol (TCP) port, such as port 9100 or 515, to cause locked print process 120 to receive and process the print data.

In step 208, the print data is processed by locked print process 120. According to one embodiment of the invention, locked print process 120 examines the print data to determine whether locked printing has been specified. This may be determined, for example, by the presence of one or more commands in the print data that indicate that locked printing has been specified. If locked printing has been specified, then in step 210, locked print process 120 stores the print data in print data 128 on storage 124 of printing device 106. If locked printing has not been specified in the print data, then the print data may be provided to print process 118 for processing. According to one embodiment of the invention, if locked printing has not been specified for print data, then the print data is deleted and not processed at printing device 106. This process may be repeated for any number of print data, from any number of client devices. Each print data that is received and determined to have locked printing specified is stored onto storage 124. Print data stored on storage 124 may be compressed and/or encrypted to save space and to provide additional security.

Figure 6:
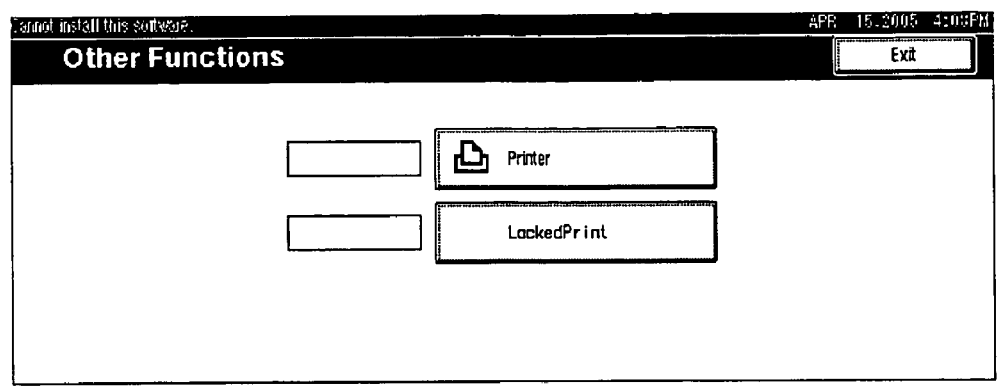
FIG. 6 includes options for accessing a printing device, including performing locked printing functions.
Figure 7:
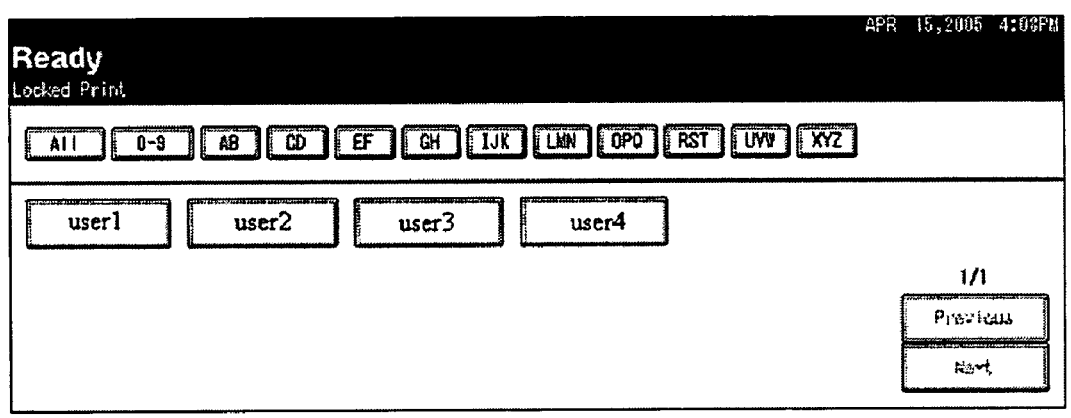
FIG. 7 depicts an example user interface screen that allows a user to select a user ID.
Figure 8:
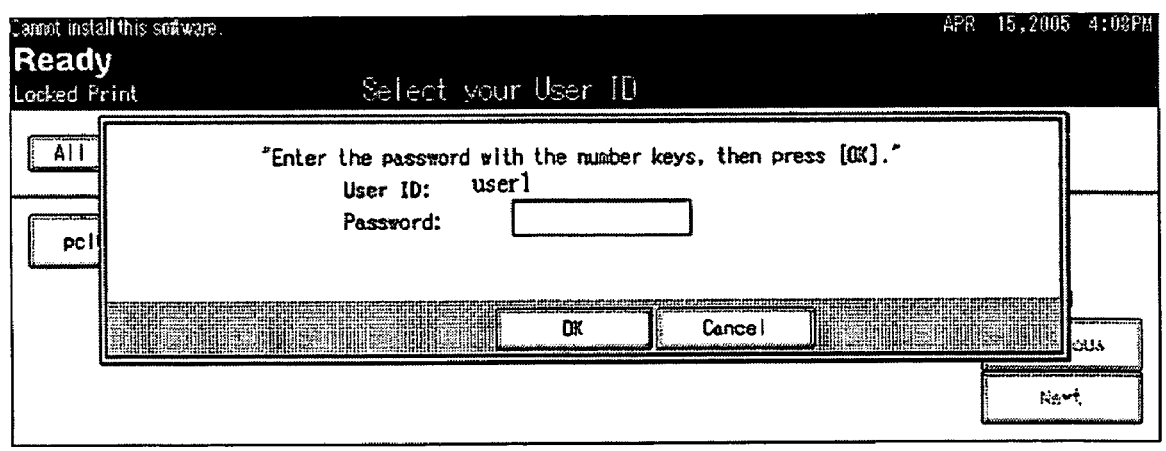
FIG. 8 depicts an example user interface screen for querying a user for a password associated with a user ID.
Figure 9:
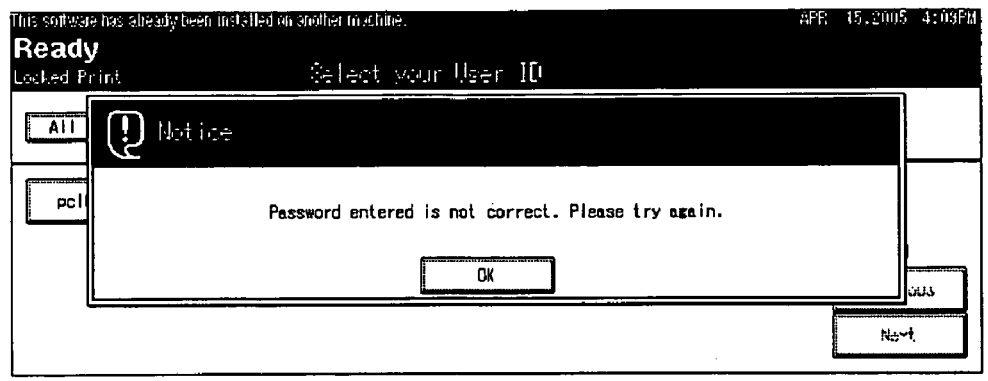
FIG. 9 depicts a user interface screen querying a user for another password if the password entered is not the correct password for the particular user ID.

At some point in time, a user wishes to have print data that is stored on printing device 106 processed. In step 212, the user accesses printing device 106 and activates a locked printing feature. For example, at printing device 106, the user accesses user interface 116 and may be presented with a screen similar to the screen depicted in FIG. 6, that includes options for accessing printing device 106, including performing locked printing functions. In step 214, the user selects a user ID and enters corresponding password data that is authenticated. For example, FIG. 7 depicts an example user interface screen that allows a user to select a user ID. User IDs may be personalized to individual users and may also represent logical groups, such as a department in a business organization. As depicted in FIG. 7, for large numbers of user IDs, the user interface screen may also provide for selecting from many user IDs based upon starting numbers or letters. As depicted in FIG. 8, the user is queried for password data, in the form of a password, that is associated with the selected user ID and in step 216, the user ID/password pair is authenticated. User ID/password combinations may be authenticated based upon data stored locally on printing device 106. Alternatively, user ID/password combinations may be authenticated based upon data stored elsewhere. For example, printing device 106 may transmit user ID/password combinations over network 108 to an authentication server that authenticates the user ID/password combinations and returns data to printing device 106 indicating whether the authentication was successful. There is not necessarily a one-to-one relationship between user IDs and passwords and one-to-many relationships may also be used. For example, each member of a department may have their own password that is associated with a single user ID associated with the department. A single user may also use multiple passwords for a single user ID, for example, to provide added protection. Users may also have multiple user IDs. As depicted in FIG. 9, the user may be queried for another password if the password entered is not the correct password for the particular user ID.

Figure 10:
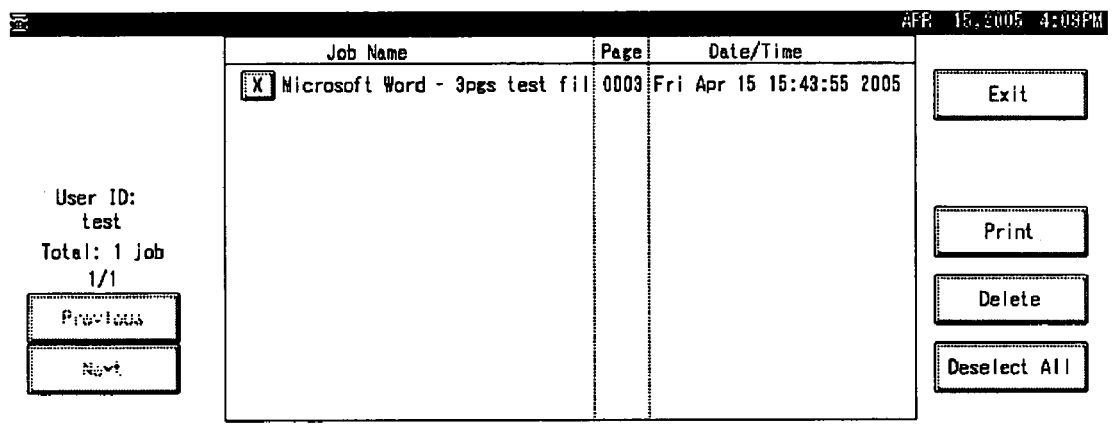
FIG. 10 depicts an example list of print data or print jobs that are associated with a user ID/password pair.

In step 218, a list of print data associated with the authenticated user ID/password pair is presented to the user. FIG. 10 depicts an example list of print data or print jobs that are associated with the user ID/password pair. As depicted in FIG. 10, the user ID and the total number of print data or print jobs associated with the user ID may be displayed. Navigation controls, such as "next page" and "previous page," may also be provided in situations where the number of print data or print jobs exceeds the available viewing area. The user may also exit the job list by selecting an "exit" option. Print data or print jobs may be displayed in various orders, for example, by time received (or age), order received, alphabetically by name, size or whether print data has been selected and/or printed, as described hereinafter. The order in which print data or print jobs are displayed may be configured by an administrator as described in more detail hereinafter.

Figure 11:
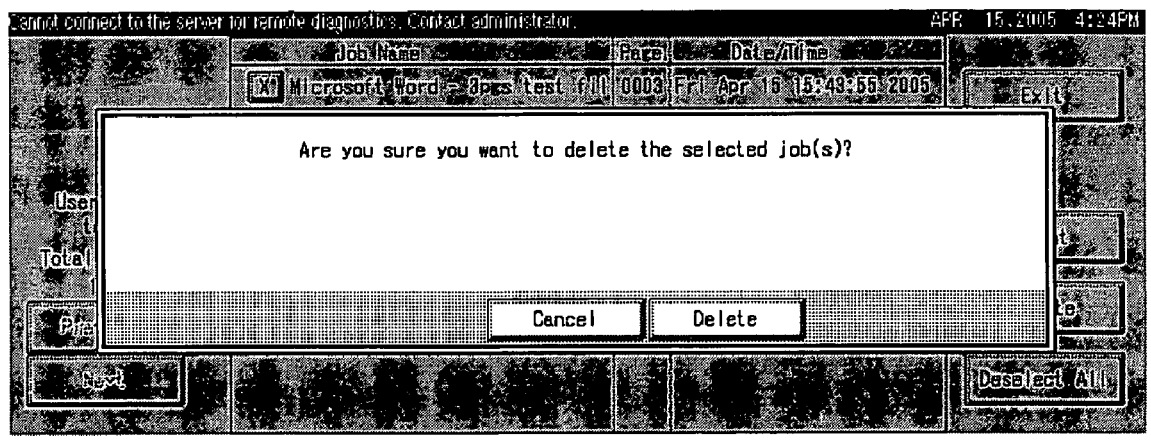
FIG. 11 depicts a user interface screen that queries a user to confirm the deletion of print data before the print data is deleted from printing device.

In step 220, the user may select one or more print data and perform an action on the selected print data. As also depicted in FIG. 10, the user may select print data, either individually or using a "select all" options, and then perform an action, such as print or delete the selected print data. Selected print data may also be deselected by selecting the "deselect option." In response to the user selecting to print particular print data, locked print process 120 causes the print data to be processed by print process 118. In response to the user selecting to delete the particular print data, locked print process 120 causes the print data to be deleted. As depicted in FIG. 11, the user may be queried to confirm the deletion of print data before the print data is deleted from printing device 106.

Figure 12:
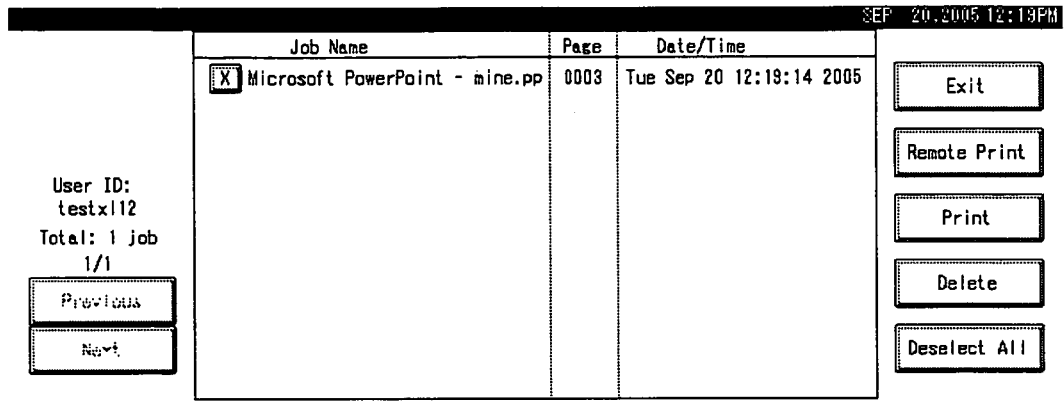
FIG. 12 depicts an example user interface screen that includes a "remote print" option.
Figure 13:
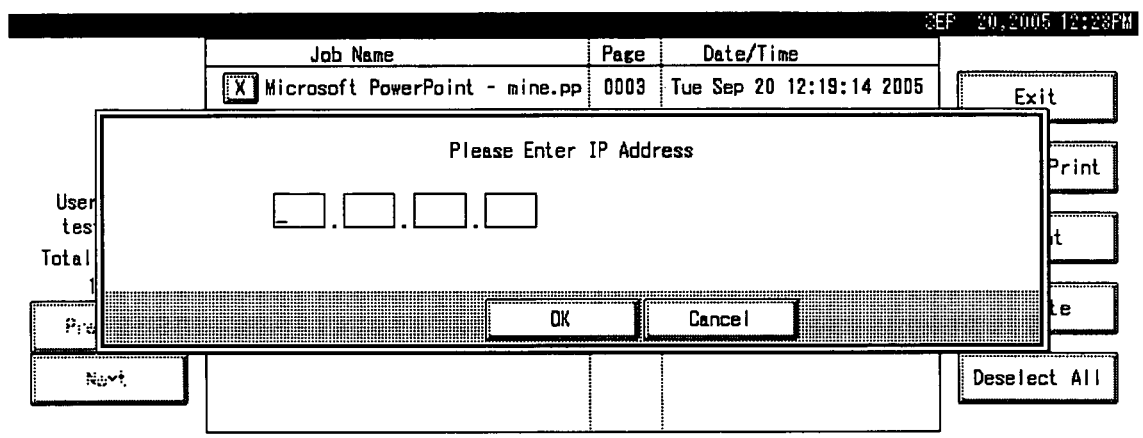
FIG. 13 depicts an example user interface screen that queries a user for an IP address of a destination network device.

According to one embodiment of the invention, a remote printing function is made available to users. The remote printing function allows a user to forward print data to another network device for processing. FIG. 12 depicts an example user interface screen that includes a "remote print" option. Once one or more print data or print jobs have been selected and the remote print function selected, the user is queried for a destination to which the selected print data or print jobs are to be transmitted. FIG. 13 depicts an example user interface screen that queries a user for an IP address of a destination network device. Instead of requiring users to enter an IP address, a user may be queried for a name of a destination network device and the IP address of that destination network device can be looked up based upon the name, for example, by performing a domain name search or using a lookup table. For example, a user may enter the name of a particular printing device that has a name associated with the user's department. Once a valid destination network device has been specified, the selected print data is sent to the specified destination network device for processing. Print data that has been forwarded to another network device for processing using the remote print option may be deleted from printing device 106.

V. Housekeeping and Logging Functions

Locked print process 120 may be configured to perform various "housekeeping" and logging functions. According to one embodiment of the invention, locked print process 120 is configured to automatically delete print data from storage 124. A wide variety of criteria may be used to perform automatic deletion of print data and the invention is not limited to any particular criteria. For example, locked print process 120 may be configured to detect that storage 124 is nearing full and to automatically delete print data stored thereon. The detection may be made, for example, when the amount of available storage 124 falls below a specified threshold. Once a determination has been made that print data should be deleted from storage 124, then locked print process 120 causes print data to be deleted until a sufficient amount of storage 124 has been made available. This may be accomplished, for example, by deleting the oldest print data from storage 124. Various other heuristics may be used to select particular print data to be deleted. As an alternative to automatically deleting print data based upon less than a threshold amount of storage 124 being available, locked print process 120 may automatically delete print data based upon expiration, i.e., print data that is older than a specified time.

According to another embodiment of the invention, locked print process 120 is configured to generate and maintain log data 130 on storage 124 that records locked printing events that occur on printing device 106. The particular data included in log data 130 may vary, depending upon a particular implementation, and the invention is not limited to any particular log data. Examples of log data include, without limitation, print data received by printing device 106 and how that print data was processed, e.g., printed, forwarded to another network device for remote printing, or deleted. Different levels of logging may be provided, based upon the amount of details desired. According to one embodiment of the invention, names of print data or print jobs may be excluded from log data 130. This may be useful in situations where print data contains sensitive information. All of the attributes of the housekeeping and logging functions may be established and maintained by an administrator and reflected in configuration data 126.

VI. Web-Based User Interface for Configuring Locked Printing

As previously described herein, a wide variety of user interface objects may be employed to provide the Web-based administrative user interface for configuring locked printing.

Figure 14:
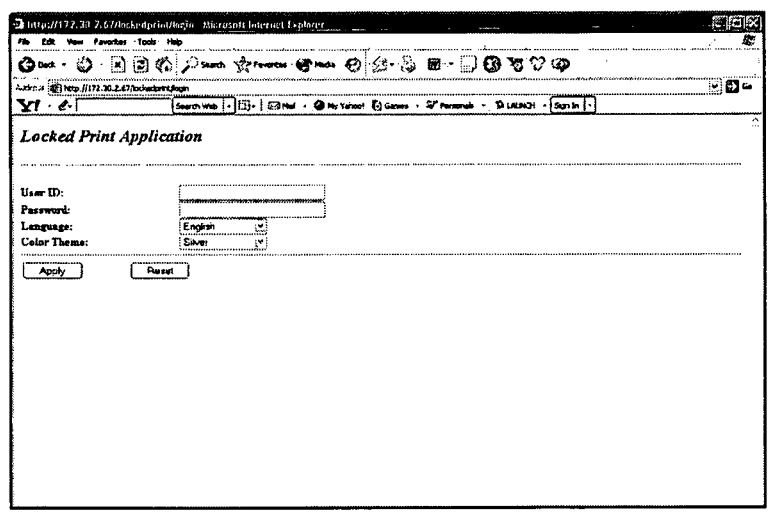
FIG. 14 depicts an example user interface screen for entering valid user ID/password combinations, a language and color theme.
Figure 15:
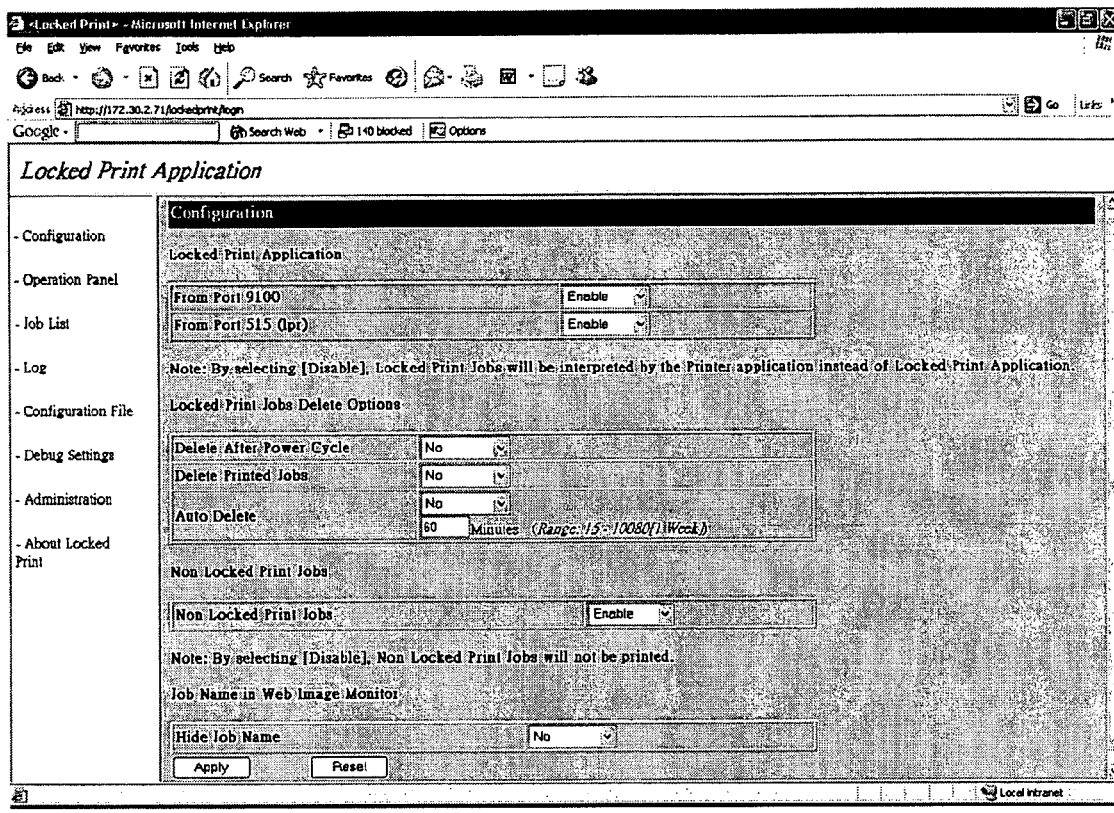
FIG. 15 depicts an example user interface screen that allows an administrator to specify numerous locked printing attributes.

FIG. 14 is a block diagram that depicts an example user interface screen for entering valid user ID/password combinations, a language and color theme. FIG. 15 is a block diagram that depicts a user interface screen that allows an administrator to specify numerous locked printing attributes. In this example, an administrator may specify particular ports to be used by locked print process 120 to receive print data. This user interface screen also allows an administrator to specify various housekeeping functions, such as whether print data is to be deleted after printing device 106 has been power cycled, after print data has been printed and auto delete options. This user interface screen also allows an administrator to specify how to process print data that does not indicate that locked printing should be used, for example, whether to delete this type of print data. Although not specifically depicted in FIG. 15, a user interface screen such as depicted in FIG. 15 may also allow an administrator to specify whether the names of print data are to not be included in the log and also the types of error messages that should be used to validate an input form.

Figure 16:
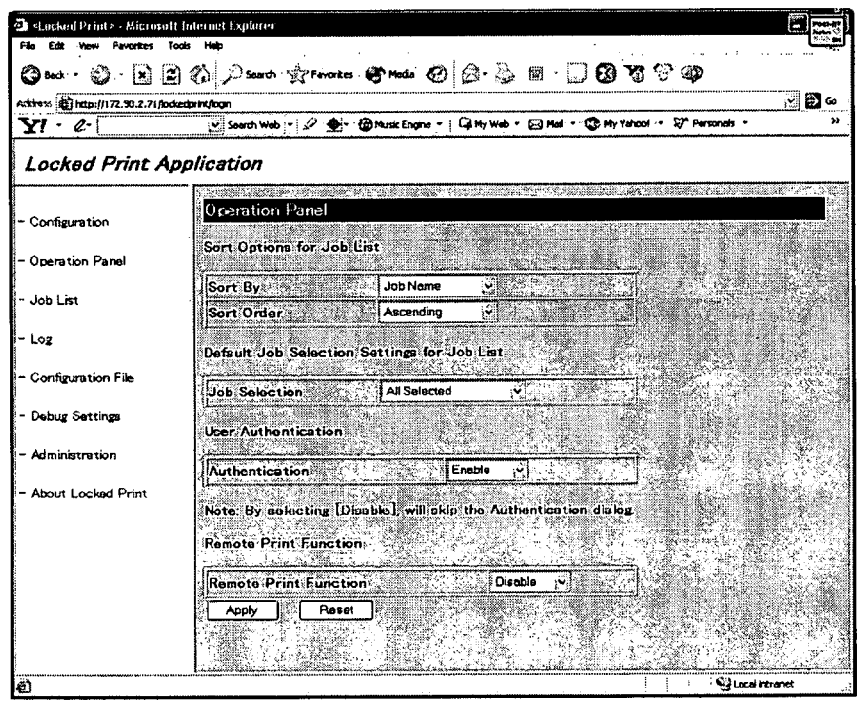
FIG. 16 depicts an example user interface screen to allow an administrator to specify options for the list of available print data after a user ID/password combination has been validated, including sort options, default print data selection, whether user authentication is to be used (user ID/password authentication) and whether remote printing is to be enabled.
Figure 17:
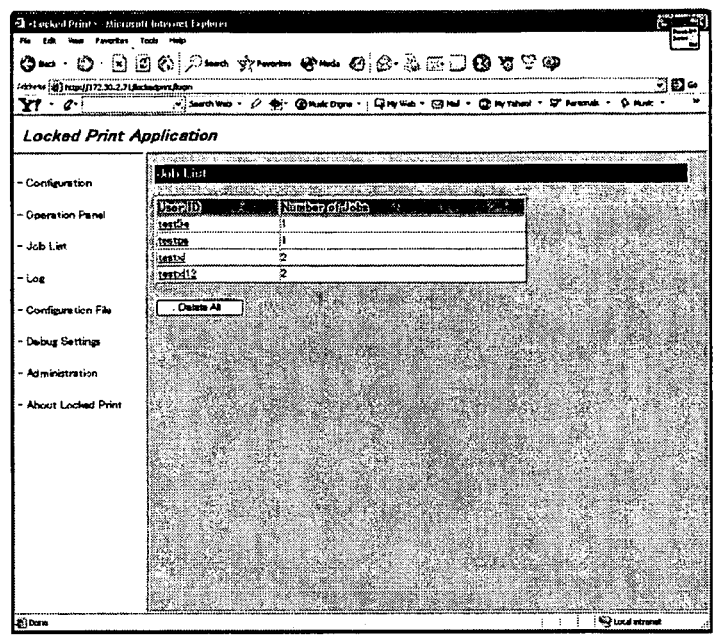
FIG. 17 depicts a user interface screen that allows an administrator to view all the active users on printing device and their corresponding print data or print jobs.
Figure 18:
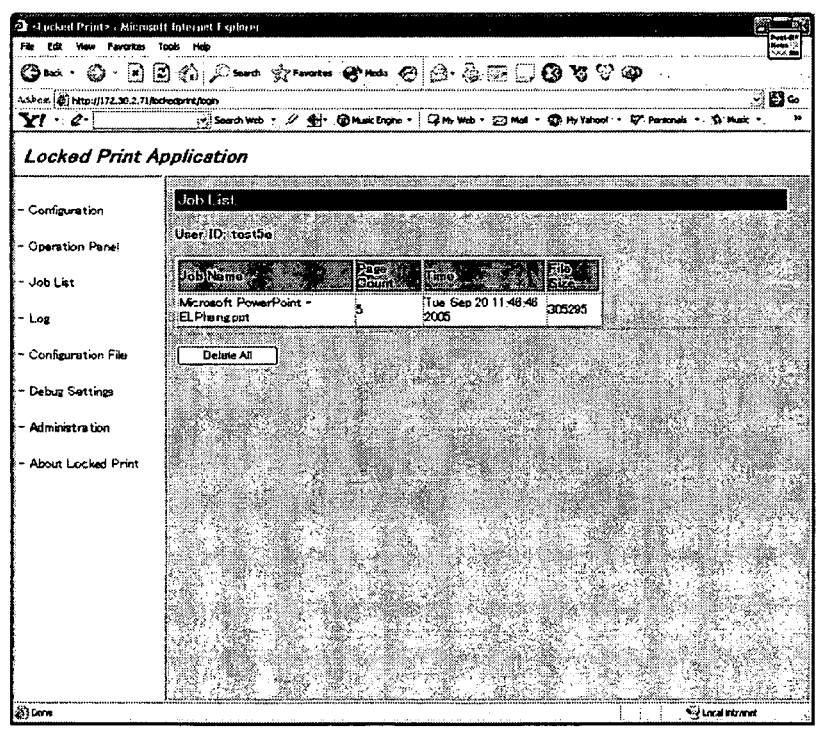
FIG. 18 depicts a user interface screen that allows an administrator to delete all print data associated with a particular user.

FIG. 16 depicts an example user interface screen to allow an administrator to specify options for the list of available print data after a user ID/password combination has been validated, including sort options, default print data selection, whether user authentication is to be used (user ID/password authentication) and whether remote printing is to be enabled. FIG. 17 depicts a user interface screen that allows an administrator to view all the active users on printing device 106 and their corresponding print data or print jobs. FIG. 18 depicts a user interface screen that allows an administrator to delete all print data associated with a particular user.

Figure 19:
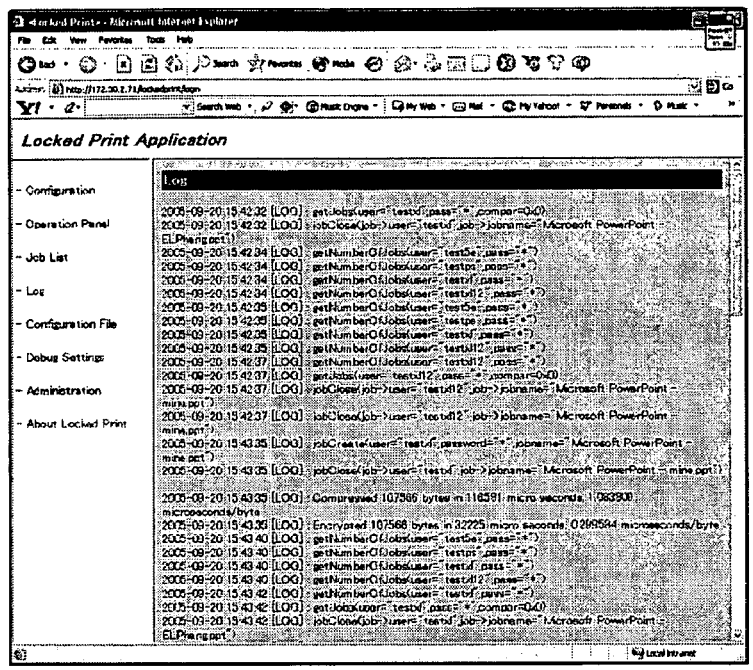
FIG. 19 depicts a user interface screen that allows an administrator to view the contents of log data.
Figure 20:
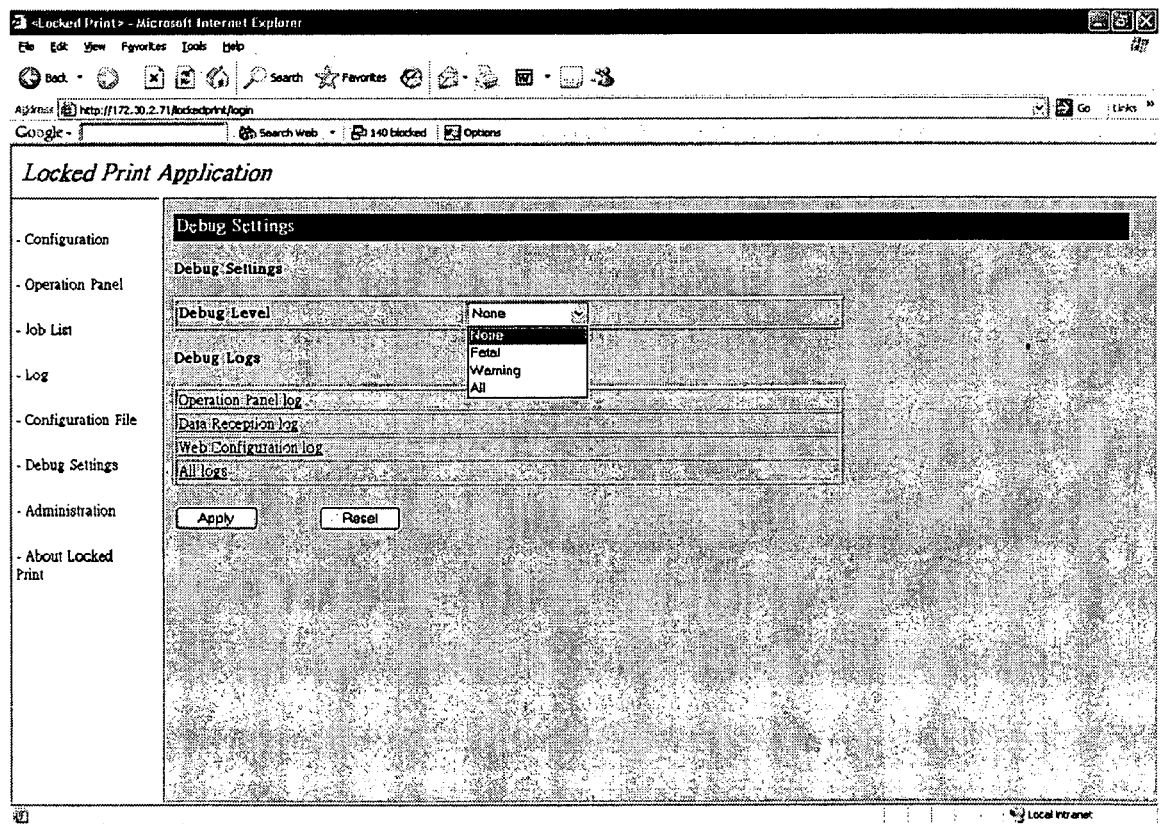
FIG. 20 depicts a user interface screen that allows an administrator to specify a debug log level that controls the amount of information included in log data.
Figure 21:
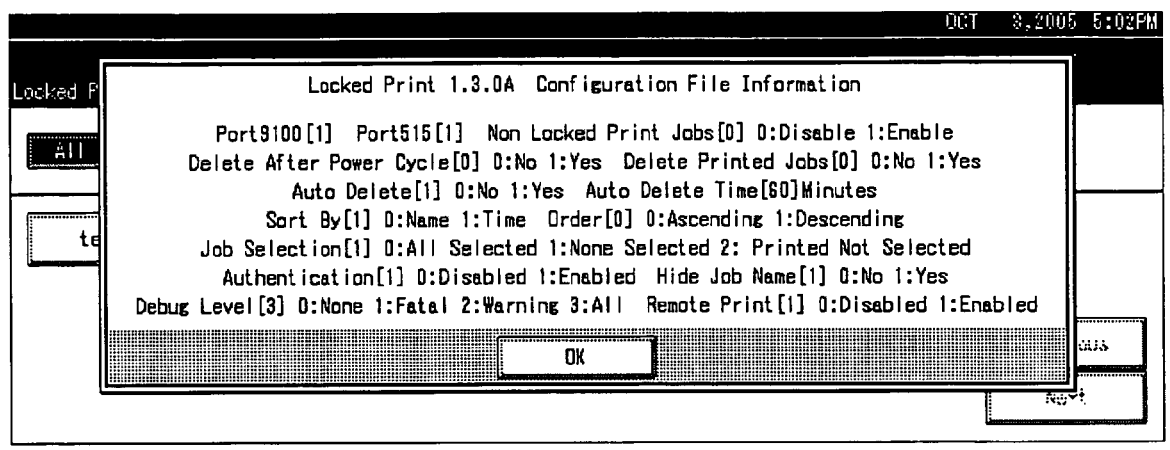
FIG. 21 depicts the example contents of a locked printing configuration file that might be viewed by an administrator.

FIG. 19 depicts a user interface screen that allows an administrator to view the contents of log data 130. FIG. 20 depicts a user interface screen that allows an administrator to specify a debug log level that controls the amount of information included in log data 130. For example, all messages may be logged, only warning and fatal errors can be logged, only fatal errors can be logged, or no logging may be selected. FIG. 21 depicts the example contents of a locked printing configuration file that might be viewed by an administrator.

VII. Configuration Files

According to one embodiment of the invention, configuration data may be generated at admin client device 104 and provided to printing device 106 for processing. For example, ad administrator may use an editing tool to create a configuration data file on admin client device 104. The administrator then uses Web browser 114, or another process executing on admin client device 104, to transmit the configuration data file to printing device 106. The configuration data file may be transmitted to the particular port associated with locked print process 120 so that locked print process 120 will receive and process the configuration data file. Locked print process 120 recognizes the configuration data file and stores the configuration data on storage 124. This approach is useful, for example, in situations where a large number of printing devices need to be configured with the same configuration.

VIII. Implementation Mechanisms

Figure 22:
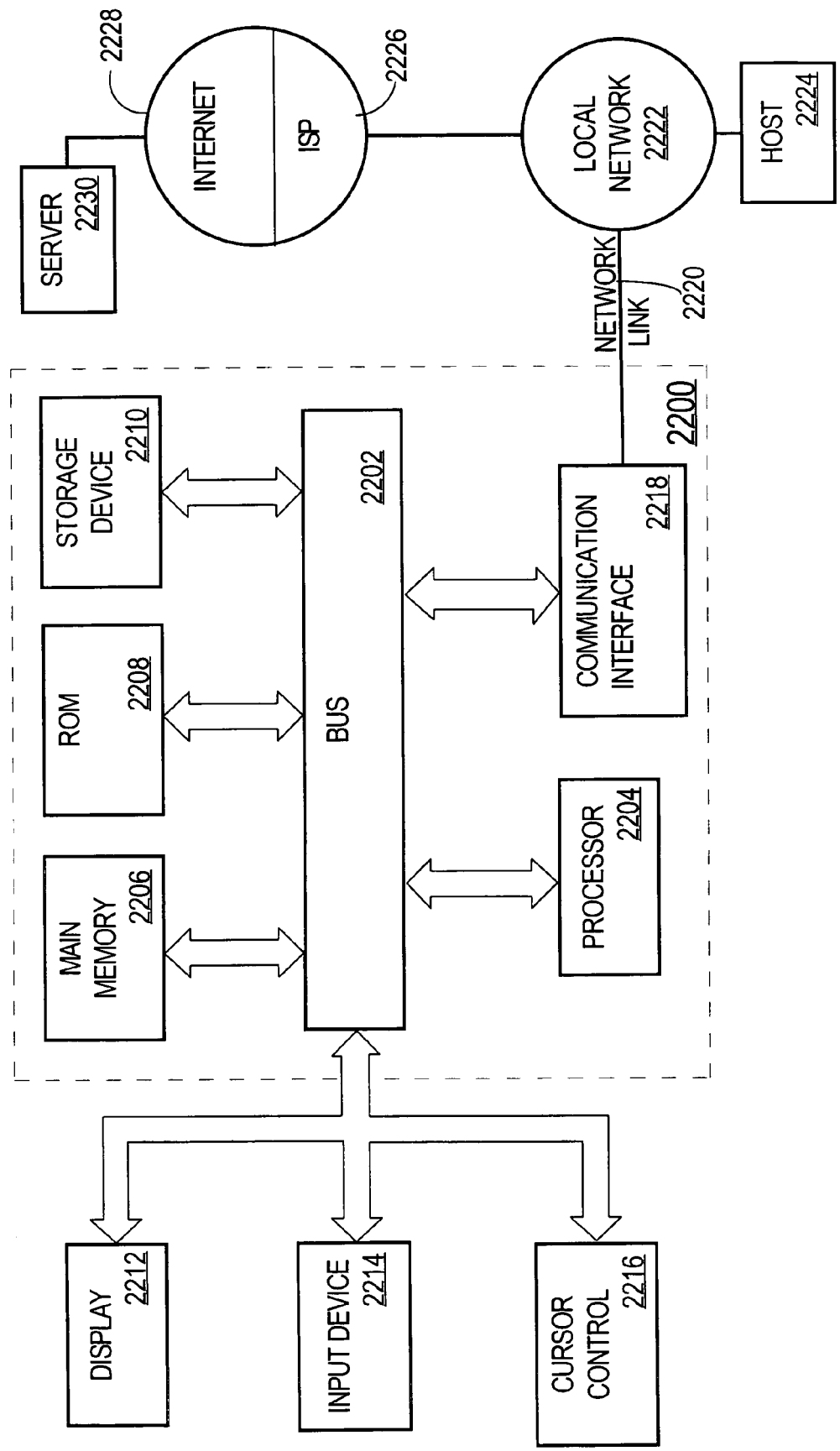
FIG. 22 is a block diagram of a computer system on which embodiments of the invention may be implemented.

The approach described herein for implementing locked printing may be implemented on any type of computing platform or architecture. For purposes of explanation, FIG. 22 is a block diagram that illustrates an example computer system 2200 upon which an embodiment of the invention may be implemented. Computer system 2200 includes a bus 2202 or other communication mechanism for communicating information, and a processor 2204 coupled with bus 2202 for processing information. Computer system 2200 also includes a main memory 2206, such as a random access memory (RAM) or other dynamic storage device, coupled to bus 2202 for storing information and instructions to be executed by processor 2204. Main memory 2206 also may be used for storing temporary variables or other intermediate information during execution of instructions to be executed by processor 2204. Computer system 2200 further includes a read only memory (ROM) 2208 or other static storage device coupled to bus 2202 for storing static information and instructions for processor 2204. A storage device 2210, such as a magnetic disk or optical disk, is provided and coupled to bus 2202 for storing information and instructions.

Computer system 2200 may be coupled via bus 2202 to a display 2212, such as a cathode ray tube (CRT), for displaying information to a computer user. An input device 2214, including alphanumeric and other keys, is coupled to bus 2202 for communicating information and command selections to processor 2204. Another type of user input device is cursor control 2216, such as a mouse, a trackball, or cursor direction keys for communicating direction information and command selections to processor 2204 and for controlling cursor movement on display 2212. This input device typically has two degrees of freedom in two axes, a first axis (e.g., x) and a second axis (e.g., y), that allows the device to specify positions in a plane.

The invention is related to the use of computer system 2200 for implementing the techniques described herein. According to one embodiment of the invention, those techniques are performed by computer system 2200 in response to processor 2204 executing one or more sequences of one or more instructions contained in main memory 2206. Such instructions may be read into main memory 2206 from another machine-readable medium, such as storage device 2210. Execution of the sequences of instructions contained in main memory 2206 causes processor 2204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 2200, various machine-readable media are involved, for example, in providing instructions to processor 2204 for execution. Such a medium may take many forms, including but not limited to, non-volatile media, volatile media, and transmission media. Non-volatile media includes, for example, optical or magnetic disks, such as storage device 2210. Volatile media includes dynamic memory, such as main memory 2206. Transmission media includes coaxial cables, copper wire and fiber optics, including the wires that comprise bus 2202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 2204 for execution. For example, the instructions may initially be carried on a magnetic disk of a remote computer. The remote computer can load the instructions into its dynamic memory and send the instructions over a telephone line using a modem. A modem local to computer system 2200 can receive the data on the telephone line and use an infra-red transmitter to convert the data to an infra-red signal. An infra-red detector can receive the data carried in the infra-red signal and appropriate circuitry can place the data on bus 2202. Bus 2202 carries the data to main memory 2206, from which processor 2204 retrieves and executes the instructions. The instructions received by main memory 2206 may optionally be stored on storage device 2210 either before or after execution by processor 2204.

Computer system 2200 also includes a communication interface 2218 coupled to bus 2202. Communication interface 2218 provides a two-way data communication coupling to a network link 2220 that is connected to a local network 2222. For example, communication interface 2218 may be an integrated services digital network (ISDN) card or a modem to provide a data communication connection to a corresponding type of telephone line. As another example, communication interface 2218 may be a local area network (LAN) card to provide a data communication connection to a compatible LAN. Wireless links may also be implemented. In any such implementation, communication interface 2218 sends and receives electrical, electromagnetic or optical signals that carry digital data streams representing various types of information.

Network link 2220 typically provides data communication through one or more networks to other data devices. For example, network link 2220 may provide a connection through local network 2222 to a host computer 2224 or to data equipment operated by an Internet Service Provider (ISP) 2226. ISP 2226 in turn provides data communication services through the world wide packet data communication network now commonly referred to as the "Internet" 2228. Local network 2222 and Internet 2228 both use electrical, electromagnetic or optical signals that carry digital data streams. The signals through the various networks and the signals on network link 2220 and through communication interface 2218, which carry the digital data to and from computer system 2200, are exemplary forms of carrier waves transporting the information.

Computer system 2200 can send messages and receive data, including program code, through the network(s), network link 2220 and communication interface 2218. In the Internet example, a server 2230 might transmit a requested code for an application program through Internet 2228, ISP 2226, local network 2222 and communication interface 2218. The received code may be executed by processor 2204 as it is received, and/or stored in storage device 2210, or other non-volatile storage for later execution. In this manner, computer system 2200 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a user interface configured to display information and accept user input;
   a locked print process configured to:
      examine print data received by the printing device to determine whether password data must be verified at the printing device before a printed version of an electronic document reflected in the print data can be generated,
      if password data must be verified at the printing device before a printed version of an electronic document reflected in the print data can be generated, then cause the print data to be stored on the printing device,
      verify password data entered via the user interface and if the password data is successfully verified, then allow the printed version of the electronic document reflected in the print data to be generated; and
   a Web server configured to:
      generate one or more Web pages and cause the one or more Web pages to be provided to a client device, wherein processing of the one or more Web pages at the client device allows a user to enter configuration data that defines one or more functions performed by the locked print process, and
      receive the configuration data from the client device.

2. The printing device as recited in claim 1, wherein locked print process is further configured to cause to be displayed on the user interface, data that indicates one or more print jobs associated with an identification associated with the password data, wherein the one or more print jobs are displayed on the user interface in an order based upon when the one or more print jobs were received at the printing device.

3. The printing device as recited in claim 1, wherein locked print process is further configured to cause to be displayed on the user interface, data that indicates one or more print jobs associated with an identification associated with the password data, wherein the one or more print jobs are displayed on the user interface in an order based upon names of the one or more print jobs.

4. The printing device as recited in claim 1, wherein the locked print process is further configured to:
   cause a user interface object to be displayed on the user interface, wherein the user interface object is associated with both a user and the password data, and
   in response to detecting a selection of the user interface object, causing a query to be displayed on the user interface requesting entry of the password data.

5. The printing device as recited in claim 1, wherein the locked print process is further configured to:
   cause a user interface object to be displayed on the user interface, wherein the user interface object is associated with both two or more users and the password data, and
   in response to detecting a selection of the user interface object, causing a query to be displayed on the user interface requesting entry of the password data.

6. The printing device as recited in claim 1, wherein the locked print process is further configured to:
   in response to user input to the user interface,
      causing a query to be displayed on the user interface requesting data that identifies a network device, and
      causing the print data to be transmitted to the network device for processing.

7. The printing device as recited in claim 6, wherein the locked print process is further configured to:

in response to receiving a text string entered via the user interface,
performing a network address lookup to identify a network address associated with the text string, and
causing the print data to be transmitted to the network address.

8. The printing device as recited in claim 1, wherein the locked print process is further configured to generate log data that indicates that the print data was successfully processed and the printed version of the electronic document was generated, wherein a name associated with the electronic document is not included in the log data.

9. The printing device as recited in claim 1, wherein the locked print process is further configured to if data does not need to be verified at the printing device before a printed version of an electronic document reflected in the print data can be generated, then cause the print data to be deleted.

10. The printing device as recited in claim 1, wherein the locked print process is further configured to cause the print data to be deleted from the printing device if the print data is older than a specified date.

11. The printing device as recited in claim 1, wherein the locked print process is further configured to cause the print data to be deleted from the printing device if an amount of available storage space on the printing device is less than a specified threshold.

12. The printing device as recited in claim 1, wherein the printing device may be configured to support locked print process is further configured to cause the print data to be deleted from the printing device if an amount of available storage space on the printing device is less than a specified threshold.

* * * * *